United States Patent [19]
Rigstad et al.

[11] Patent Number: 6,044,150
[45] Date of Patent: Mar. 28, 2000

[54] METHOD AND APPARATUS FOR A HOST-BASED PERSONAL COMPUTER SPEAKERPHONE

[75] Inventors: Peter Rigstad, Salt Lake City; Nathan Whitney, W. Jordan, both of Utah

[73] Assignee: 3COM Corporation, Santa Clara, Calif.

[21] Appl. No.: 08/918,516

[22] Filed: Aug. 21, 1997

[51] Int. Cl.[7] .................................................. H04M 1/20
[52] U.S. Cl. ...................... 379/387; 379/380; 379/93.05
[58] Field of Search .............................. 379/88.07, 93.01, 379/93.09, 93.11, 406, 410, 420, 110.01, 100.16, 100.15, 100.14, 93.21, 93.23, 93.05, 387, 388, 389, 390

[56] References Cited

U.S. PATENT DOCUMENTS

| | | | |
|---|---|---|---|
| 5,335,313 | 8/1994 | Douglas | 395/2.84 |
| 5,434,913 | 7/1995 | Tung et al. | 379/202 |
| 5,444,768 | 8/1995 | Lemaire et al. | 379/68 |
| 5,526,408 | 6/1996 | Yekutiely | 379/90 |
| 5,535,204 | 7/1996 | Li | 370/76 |
| 5,568,540 | 10/1996 | Greco et al. | 379/89 |
| 5,574,725 | 11/1996 | Sharma et al. | 370/79 |
| 5,598,466 | 1/1997 | Graumann | 379/389 |
| 5,675,390 | 10/1997 | Schindler et al. | 348/552 |
| 5,793,843 | 8/1998 | Morris | 379/420 |
| 5,875,233 | 2/1999 | Cox | 379/88.07 |

*Primary Examiner*—Scott L. Weaver
*Attorney, Agent, or Firm*—Workman, Nydegger & Seeley

[57] ABSTRACT

A method and apparatus for implementing a speakerphone within a personal computer having a voice-capable modem and an audio board is provided. The personal computer executes host software providing the user interface for speakerphone operation and the indirect interconnection for audio data routing between the voice-capable modem and the audio board without requiring physical jumpering between the modem and audio board. For half duplex speakerphone operation, the host software performs switching between transmit and receive modes by monitoring received audio signal energy levels and switching accordingly. For full duplex operation of the voice-capable modem, the modem's DSP provides echo cancellation of locally generated echoes. Also, for full duplex operation of the audio board, the host software provides echo cancellation for acoustic echoes generated by the speaker audio feeding into the user's microphone.

12 Claims, 6 Drawing Sheets

METHOD AND APPARATUS FOR A HOST-BASED PERSONAL COMPUTER SPEAKERPHONE

BACKGROUND OF THE INVENTION

1. The Field of the Invention

This invention relates to hands-free telephonic communication using a speakerphone for announcing received telephonic interaction and for receiving user-generated voice information for transmission. More particularly, this invention relates to implementing speakerphone functionality within a personal computer having both audio and modem boards for forming a speakerphone.

2. Present State of the Art

Speakerphones have been implemented in a variety of form-factors which enable a user to engage in a hands-free telephonic conversation. Historical implementations of speakerphones include traditional desktop telephones having a speaker and a microphone resident therein. Other speakerphone form-factors include dedicated telephonic devices lacking a basic handset for conducting a private conversation while possessing only a speaker and a microphone for facilitating communication.

Such dedicated equipment is comprised of a substantial amount of logic and capability necessary to facilitate a hands-free communication session. More simplistic models, for example, of speakerphones facilitate conversation in only one direction. Such half duplex speakerphones must monitor and perform directional switching of conversations. Logic associated with conversation detection and switching may assume complex implementations requiring substantial electronic logic. Furthermore, speakerphone implementations facilitating simultaneous bi-directional or full duplex communication also require a substantial amount of logic for implementing such functionality.

Other unrelated developing technologies include a personal computer 10 (FIG. 1) which incorporates other forms of media such as audio functionality in addition to traditional data transmission. For example, a dedicated audio board 28 capable of transducing sound received from a microphone 30 into digital data for playback or transmission has become commonplace. Also, audio boards for converting digital data into audio signals for playback through a speaker 32 have also become ubiquitous. Such audio boards capable of receiving and vocalizing audio information have become key elements and even integral to personal multimedia computing.

Additional technological developments have occurred in modem technology with modems becoming yet another common module resident within nearly all modern personal computers. Traditional modems facilitate the transmission of data information across standard phone lines by employing modulation technology. Modern modems such as modem 14, provide a modulation-bypass channel for routing audio information, such as voice information, between the public standard telephone network (PSTN) 12 and personal computer 10. Such modems are termed "voice-capable modems."

Due to the logic-intense nature of speakerphones as described above and the logic-capable characteristics of a personal computer, the personal computer became a natural platform on which to implement speakerphone functionality. Traditional personal computer-based speakerphones employed a circuit board having voice-capable modem 14 for interfacing with PSTN 12. Additionally, a personal computer-based speakerphone utilized audio board 28 for interfacing with a speakerphone user. The audio board traditionally interfaced with microphone 30 and speaker 32 for receiving and generating perceivable audio information. Traditional voice-capable modems provided an external interface wherein voice signals 26 circumventing modulation may be interconnected directly with an audio board.

Therefore, prior art implementations of personal computer-based speakerphones utilized available external interfaces available to route an analog audio channel between the voice-capable modem and the audio board. In such implementations, host software 44 primarily performed both an activate modem process 46 for controlling and establishing a speakerphone communication session and a call processing process 48 for facilitating the dialing and other preference parameters common to speakerphone implementations.

As technology advanced and personal computers became more integrated, additional miniaturized or integrated standards through which modules, such as a voice-capable modems, communicate have developed. For example, laptop and notebook computers have assumed a much smaller form-factor than traditional desktop personal computers. To facilitate the interfacing of peripherals with notebook computers, additional bus standards such as the Personal Computer Memory Card International Association standard (hereinafter "PCMCIA") have developed which provide a smaller form-factor than traditional personal computer circuit boards. Furthermore, modern peripherals such as PCMCIA modems are designed with such a compact form-factor that the device is nearly entirely positioned within the footprint of the notebook computer with only essential interfaces available. Likewise, modern audio boards may be entirely implemented on the mother board of a notebook computer with the microphone and speaker integrated into the chassis of the computer. Such integrated, bantam configurations of peripherals such as voice-capable modems and audio boards do not lend themselves to being externally accommodating of an analog audio channel.

Thus, it appears that there exists no present technique for externally interconnecting a voice-capable modem and an audio board, or an equivalent thereof, where such external interfaces are unavailable or where such external interfaces are impractical. Furthermore, there does not currently exist interfacing techniques for coupling voice-capable modems and audio boards wherein no such external interfaces exist or wherein only one of the modules, such as the modem or the audio board incorporate an external interface. Additionally, there also does not exist a technique for interfacing a voice-capable modem with an audio board for implementing a speakerphone wherein the modem and audio board may possess incompatible directional capabilities such as in the case of one being capable of full duplex operation while the other is capable of only half duplex operation.

SUMMARY AND OBJECTS OF THE INVENTION

It is an object of the present invention to provide a method for operating as a speakerphone a personal computer having both a voice-capable modem and an audio board wherein the modem and audio board do not have an audio channel directly coupling them together.

It is another object of the present invention to provide a method for operating as a speakerphone a personal computer having a voice-capable modem and an audio board wherein the modem and the audio board exchange audio data therebetween through software operating on the personal computer.

It is yet another object of the present invention to provide a method for operating as a speakerphone a personal computer having a voice-capable modem operating in half duplex mode indirectly coupled via software to an audio board also operating in half duplex mode, wherein the speakerphone is capable of alternating between audio generated by a remote party and audio generated by a speakerphone user.

It is a further object of the present invention to provide a method for operating as a speakerphone a personal computer having a voice-capable modem operating in full duplex mode which is indirectly coupled via software to an audio board wherein a local echo generated by full duplex operation of the modem is cancelled prior to reception by said user.

It is still a further object of the present invention to provide a method for operating as a speakerphone a personal computer having a voice-capable modem indirectly coupled via software to an audio board operating in full duplex mode wherein an acoustic echo generated by said full duplex operation of the audio board is cancelled prior to reception by said remote party.

It is an object of the present invention to provide an apparatus for operating as a speakerphone a personal computer having both a voice-capable modem and an audio board wherein the modem and audio board do not have an audio channel directly coupling them together.

It is another object of the present invention to provide an apparatus for operating as a speakerphone a personal computer having a voice-capable modem and an audio board wherein the modem and the audio board exchange audio data therebetween through software operating on the personal computer.

It is yet another object of the present invention to provide an apparatus for operating as a speakerphone a personal computer having a voice-capable modem operating in half duplex mode indirectly coupled via software to an audio board also operating in half duplex mode, wherein the speakerphone is capable of alternating between audio generated by a remote party and audio generated by a speakerphone user.

It is a further object of the present invention to provide an apparatus for operating as a speakerphone a personal computer having a voice-capable modem operating in full duplex mode which is indirectly coupled via software to an audio board wherein a local echo generated by full duplex operation of the modem is cancelled prior to reception by said user.

It is still a further object of the present invention to provide an apparatus for operating as a speakerphone a personal computer having a voice-capable modem indirectly coupled via software to an audio board operating in full duplex mode wherein an acoustic echo generated by said full duplex operation of the audio board is cancelled prior to reception by said remote party.

The present invention embodies within its scope both methods and systems for implementing a speakerphone in a personal computer wherein the personal computer is comprised of a voice-capable modem and an audio board or like functionality. A personal computer interfaces with the standard or public switched telephone network (PSTN) via a modem capable of data and voice interaction with the PSTN.

In the present invention, host software forms the conduit through which voice information transfers between the audio board and the modem card. That is to say, voice information originating at the PSTN and transferring to the voice-capable modem is routed through the host software to the audio board. Likewise, any voice information generated by a user of the personal computer is transduced by a microphone and routed and processed through the audio board to the host software for subsequent dispatch to the voice-capable modem for delivery through the PSTN to the remote party.

The host software provides, among other things, a graphical interactive interface wherein a user of the personal computer, upon the execution of the host software, initiates conference communication with a remote party by either initiating and dialing a telephone number or by answering and receiving a telephone call from a remote party. Portions of the host software perform dedicated functions. For example, a user interface module provides modem setup and control for configuring the voice-capable modem, while a modem interface module and an audio board interface module provide interaction and data routing for their respective hardware boards.

Audio data flows through the present invention from the voice-capable modem interfaced to the PSTN to a data buffer generally of the form of a UART. In integrated personal computers such as notebook computers, a PCMCIA interface provides the physical coupling of the modem with the personal computer. Since the preferred embodiment of the present invention employs the Microsoft Windows® operating system, a serial VxD device driver controls the UART within the modem. Therefore, the host application interacts with the modem using communication APIs which are part of the operating system.

The speakerphone host application software is partitioned into at least three functional portions including a sound data transmit and receive portion, a user interface portion and a half duplex switching algorithm and control portion. Both half and full duplex modes of operation for both the modem and the audio board are within the scope of the present invention. Full duplex implementations do not require the half duplex switching algorithm and control portion, however, some full duplex embodiments incorporate echo cancellation techniques. The user interface portion provides a basic user interface and conduit through which standard phone functionality is implemented. The sound data transmit and receive portion provides the data pump through which audio data is exchanged between the modem and the audio board. The half duplex switching algorithm and control portion evaluates the energy levels of the audio information received from the audio board and from the modem to determine the directionality of the transfer of data. Where both the modem and the audio board operate in full duplex modes, the switching algorithm portion is unnecessary as data paths in both directions are fully implemented. However, in such a full duplex implementation, audio sound presented through a speaker may cause interference with audio sounds received at a microphone thereby requiring acoustic filtering of the user generated audio information.

For interaction with the audio board, the host software employs multi-media APIs for interfacing between the operating system and the audio board. An intermediate driver translates between the operating system API and audio board device driver. The audio board device driver provides the low-level driver interface for standardized audio boards.

For full duplex embodiments of the present invention where the modem is operating in full duplex mode, local echo cancellation may be employed to mitigate annoying audio interference. When the modem, operating in full duplex mode, both transmits and receives simultaneously across the PSTN, a DAA provides the appropriate required signal levels to drive the user generated voice information. As a result, interference may be created on the receive line in the form of a locally created echo. The local echo is mitigated by a local echo canceler resident within the voice-capable modem. Local echo cancellation is performed by employing digital signal processing techniques within the modem's DSP. The local echo canceler is implemented as a digital filter taking the form of a multi-tap Finite Impulse Response (FIR) filter.

For full duplex embodiments where the audio board operates in full duplex mode, acoustic echo cancellation may be employed to mitigate annoying audio interference. When the audio board operates in full duplex mode, audio generated at a user's speaker, which information originated at a remote party, may feed back through the microphone causing the remote party to perceive an echo of their originated signal. To suppress such an acoustic echo, the host software incorporates an acoustic echo cancellation module to suppress such an annoyance. The host software implements the acoustic echo canceler using digital signal processing techniques such as quadrature mirror filtering (QMF)before presentation to a subsequent FIR filter for acoustic echo cancellation.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention embodies within its scope both methods and systems for implementing a speakerphone in a personal computer wherein the personal computer is comprised of a voice-capable modem and an audio board or like functionality. Thus, the descriptions of the preferred embodiments which follow should be read to include both methods and apparatuses. With particular regard to the apparatuses involved, no particular limitation is envisioned. Thus, the apparatus may involve dedicated hardware including discrete components, custom VLSI chips, and the like, as well as general purpose computer digital processing hardware having a conventional arrangement including a processing unit, memory (volatile and/or non-volatile) input devices, and the like. From the description which follows, those skilled in the art will recognize that a variety of hardware and/or software configurations are suitable apparatus for practicing the disclosed invention.

Figure 1:
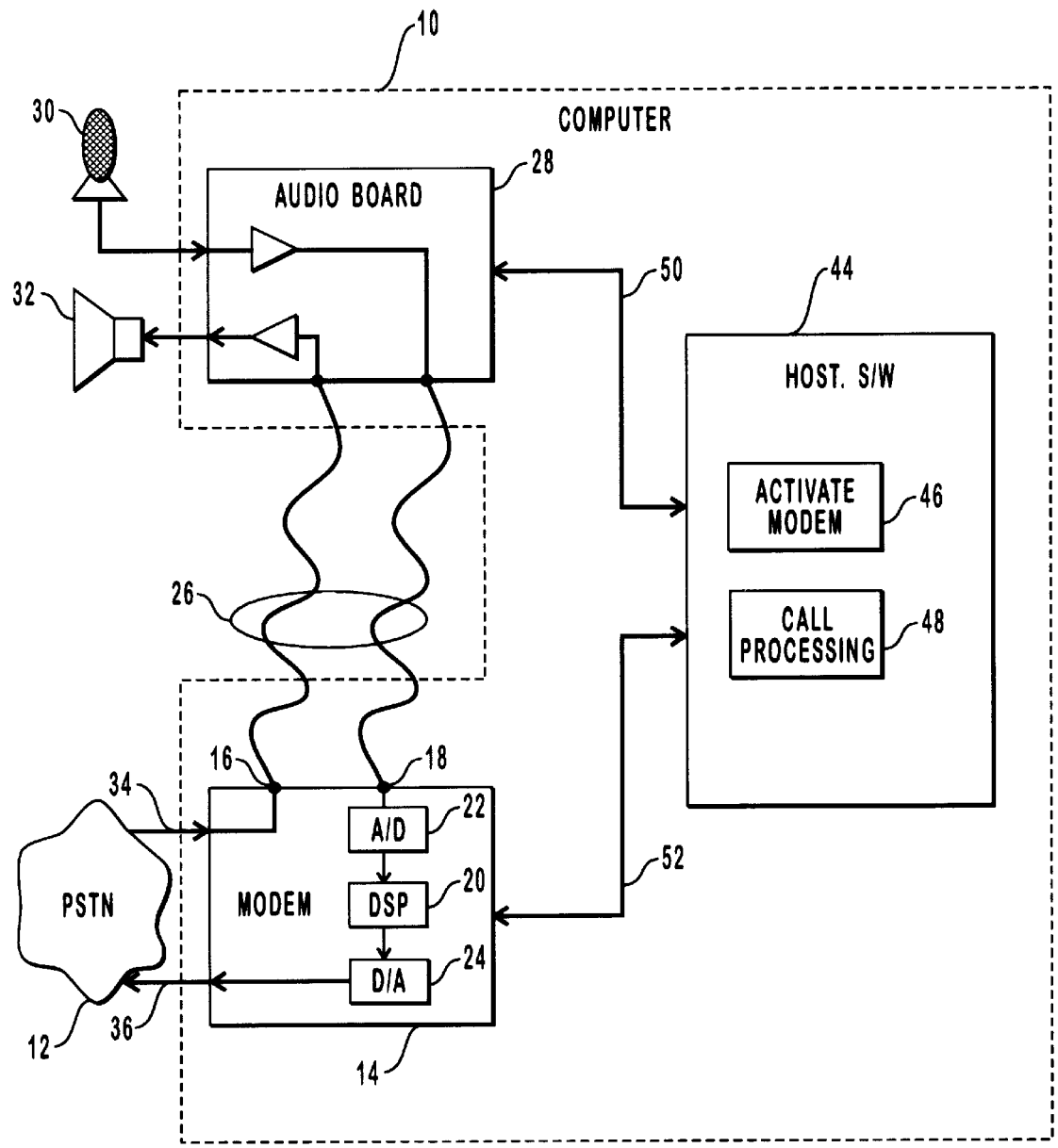
FIG. 1 is a block diagram showing an example of a prior art configuration of a speakerphone implemented within a personal computer host.
Figure 2:
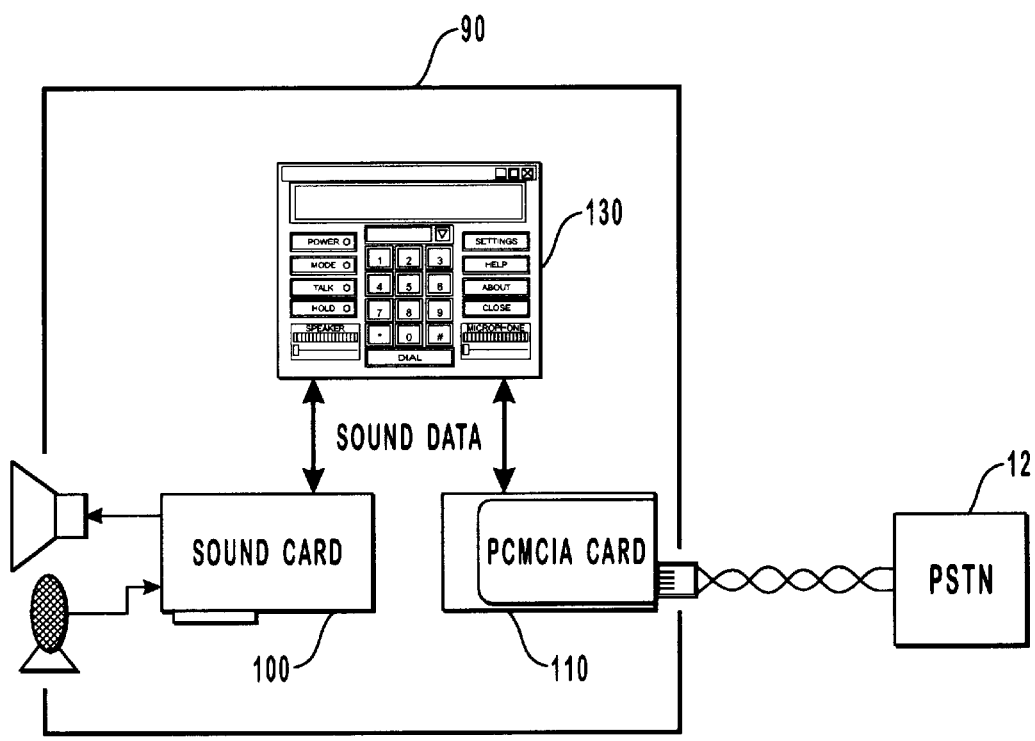
FIG. 2 is a simplified diagram showing the fundamental elements of the speakerphone of the present invention, in accordance with an embodiment of the present invention.

By way of example, and not limitation, a suitable apparatus is illustrated in FIG. 2. In FIG. 2, a personal computer 90 is illustrated interfacing with the public switched telephone network (PSTN) 12 representative of the standard interconnection between a personal computer and the standard telephone network. To facilitate such interfacing with PSTN 12, personal computer 90 is further comprised of a modem 110 capable of data and voice interaction with PSTN 12. More modern and integrated versions of personal computer 90 assume smaller form-factors such as those representative of portable and notebook computers. Such compact versions of personal computer 90 incorporate more integrated modules requiring an integrated peripheral bus standard such as Personal Computer Memory Card International Association (PCMCIA). Such integrated modules do not lend themselves to accommodating a full suite of interconnection ports. For example, traditional voice-capable modems in addition to providing a connector for interfacing with PSTN 12 also accommodated a voice-specific port from which voice data may be extracted or injected from an external source such as a sound or audio board.

Additionally, in the present invention, personal computer 90 further comprises an audio board 100 for transducing audio sounds via a microphone or transducing digital data to form an audio signal through a speaker. Audio board 100 is also known generically as a sound card facilitating an acoustic interface with personal computer 90. Audio board 100 may be a separate stand alone circuit card within personal computer 90 or, particularly for integrated personal computers such as notebook computers, may be integrated or even incorporated within the motherboard of personal computer 90. Due to such integration of audio board 100, external interfaces such as separate audio ports, particularly voice ports, are not readily available. Therefore, external jumpering of voice information between a modem card and an audio board becomes infeasible or impractical at best.

In the present invention, host software 130 forms the conduit through which voice information transfers between audio board 100 and modem card 110. That is to say, voice information originating at PSTN 12 and transferring to modem card 110 is routed through host software 130, including any processing thereon, to audio board 100 for amplification through a speaker. Likewise, any voice information generated by a user of personal computer 90 is transduced by a microphone and routed and processed through audio board 100 to host software 130 and subsequently dispatched to modem card 110 for delivery to PSTN 12 connected with a remote party.

Host software 130 further provides a graphical interactive interface wherein a user of personal computer 90 upon the execution of host software 130 may select certain speakerphone parameters for use during a particular session and furthermore may initiate conference communication with a remote party by either initiating and dialing a telephone number or by answering and receiving a telephone call from a remote party. Host software 130 thereby provides both control of the personal computer generated speakerphone and facilitates the conduit through which voice information is exchanged between the audio board and the modem.

Figure 3:
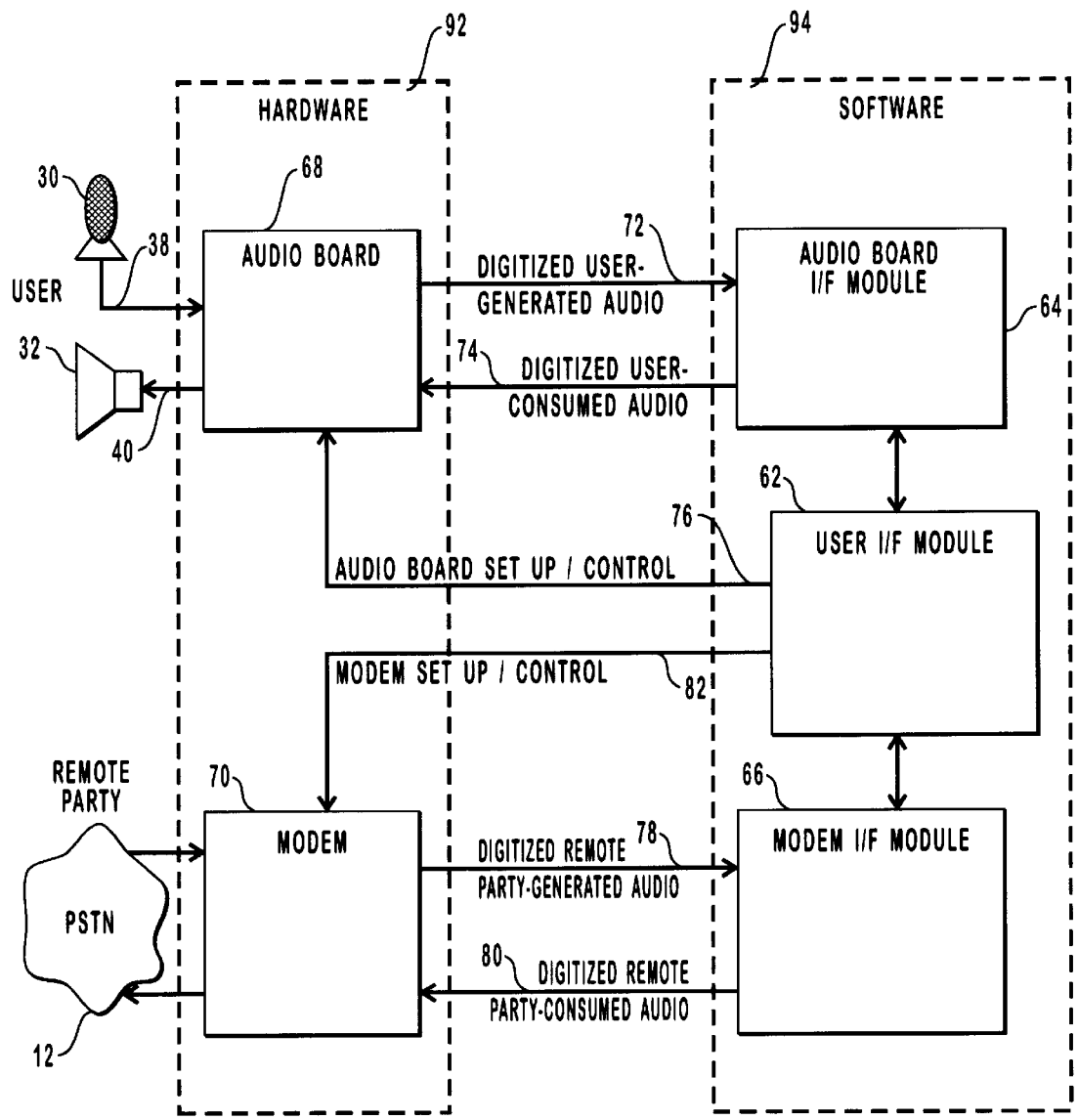
FIG. 3 is a simplified block diagram of a speakerphone implemented in a host personal computer, in accordance with a preferred embodiment of the present invention.

FIG. 3 is simplified block diagram of a speakerphone implemented in a personal computer wherein the interconnection between an audio board and a modem occurs via the host software, in accordance with a preferred embodiment of the present invention. As briefly described above, PSTN 12 interconnects a remote party with a user having a personal computer implementing a speakerphone. Interconnection between PSTN 12 and a user of the personal computer speakerphone occurs via a voice-capable modem 70 which receives remote party-generated audio and dispatches remote party-consumed audio.

Voice-capable modem 70 forms a portion of hardware 92 resident within personal computer 90 (FIG. 2). The personal computer speakerphone further comprises a software portion 94 executable upon the personal computer operating as a host for hardware 92 and software 94. A user interface module 62 provides a modem setup/control path 82 for appropriately configuring voice-capable modem 70 in the preferred embodiment. Such setup and control parameters include directing voice-capable modem 70 to configure in a voice mode thereby bypassing traditional modulation/demodulation of data exchanged with PSTN 12.

Voice-capable modem 70 further performs digitization of remote party-generated audio received from PSTN 12 to form a digitized remote party-generated audio 78 delivered to software 94. Voice-capable modem 70 further comprises digital-to-analog conversion circuitry for converting a digitized remote party-consumed audio 80 to remote party-consumed audio in analog format for delivery to PSTN 12.

A modem interface module 66, forming a portion of software 94, may cooperatively form and perform a UART function for buffering data between the host and PSTN 12. Additionally, a portion of the UART function resides within voice-capable modem 70 wherein digitized data may be transmitted and received by a buffering FIFO. In the preferred embodiment, voice-capable modem 70 assumes a form-factor of a PCMCIA module interfaced with the host personal computer. PCMCIA modules or boards interface to a PCMCIA bus structure, a portion of which may be considered to be within modem interface module software 66. PCMCIA modules are also commonly known as PC-CARD modules. Other functions that may be considered to be within modem interface module 66 that may be more generically considered to be within software 94 include operating system device drivers that interface with PCMCIA modules such as voice-capable modem 70.

Additionally, interfacing with a user of the personal computer speakerphone is facilitated via an audio board 68, also commonly known as a sound card, which couples with a microphone or transducer 30 conducting user generated audio 38 to audio board 68 and further interfaces with a speaker 32 for receiving user consumed audio 40 from audio board 68 for presentation to the speakerphone user. Audio board 68, like voice-capable modem 70, receives setup and control information from audio board setup/control 76 as generated by user interface module 62. Such setup and control signals may include configuration directives to audio board 68 to configure in full or half duplex modes, and establish sensitivity levels associated with analog signals.

Audio board 68 is further comprised of digitization components capable of converting user generated audio 38 into digitized user generated audio 72 as well as performing the converse function of receiving a digitized user consumed audio 74 and converting into analog format, user consumed audio, for delivery to speaker 32.

Audio board interface module 64 further comprises functionality such (i) as data buffering and interfacing functionality for interaction with audio board 68 such as I/O bus management and (ii) audio board drivers generally required by an operating system for interfacing with external devices such as audio board 68.

As visually depicted in FIG. 3, audio information associated with speakerphone conversations are not directly transferred between modem 70 and audio board 68 as in prior art configurations of personal computer-based speakerphone systems. Rather, in the present invention, audio information is exchanged between a user and a remote party by interconnecting both modem 70 and audio board 68 in an indirect manner via host software 94. By providing such soft interconnections, speakerphones may be implemented in personal computers having voice-capable modems and audio boards resident therein without requiring external or internal physical coupling of the boards. In the present invention, the same software that provides the user interface for facilitating the initiation and termination of speakerphone conversations also facilitates the coupling of the user and remote party interfaces by providing a software conduit for the flow of the audio information.

Figure 4:
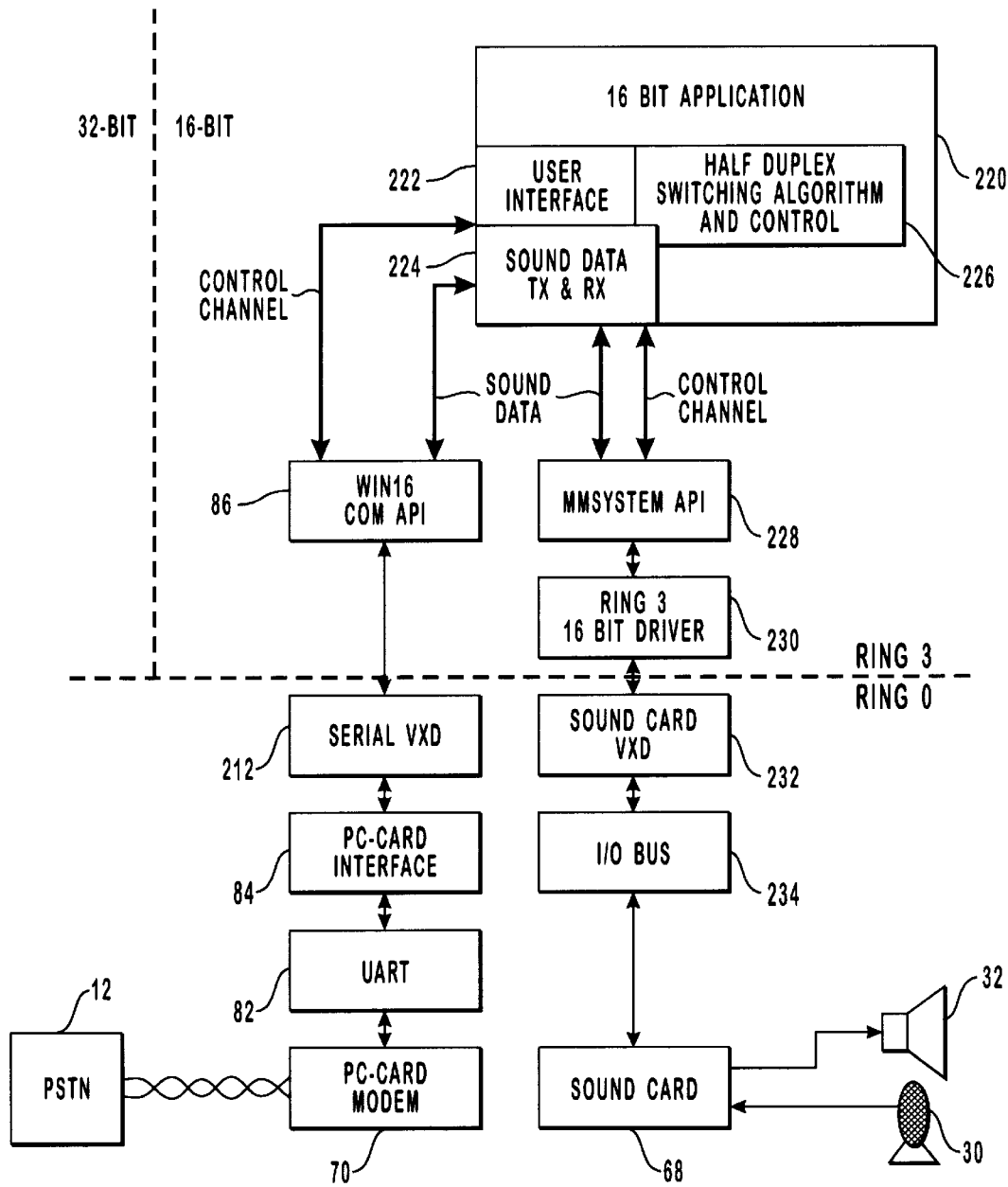
FIG. 4 is a detailed block diagram illustrating hardware and software components of a speakerphone implemented within a personal computer host, in accordance with a preferred embodiment of the present invention.

FIG. 4 is a block diagram of hardware and software components of a host-based speakerphone indirectly interconnecting a modem and an audio board via software executing on the host personal computer, in accordance with a preferred embodiment of the present invention. The preferred embodiment is a custom application implemented to operate on a Microsoft® operating system as illustrated in FIG. 4. Such an operating system is partitioned into separate levels represented by rings. In FIG. 4, ring 0 facilitates the low-level interfacing of drivers with other I/O bus processes while ring 3 modules interface with operating specific APIs such as WIN 16 COM APIs 86 and MM System API 228 which facilitate communication between a host application and peripheral elements. Although FIG. 4 illustrates the preferred embodiment as previously described, nothing prevents the migration of certain processes from ring 0 to ring 3 or from ring 3 to ring 0.

As briefly introduced above, voice-capable modem 70 interfaces with PSTN 12 for receiving and/or transmitting data to a buffer implemented as a UART 82 which may physically be implemented as a FIFO device, and in the preferred embodiment is included within the modem. Additionally, PCMCIA interface 84, also known as a PC card interface, provides the physical coupling of a PCMCIA modem 70 with a personal computer. Although a PC card interface is shown as the preferred implementation, nothing prevents other device implementations such as Card Bus, ISA, or other like implementations. A device driver known as a serial VxD 212 is a standard component within the Microsoft Windows 95® architecture. Serial VxD 212 is a virtual device driver which controls UART 82 located, in the preferred embodiment, within modem 70. Serial VxD 212 provides a data stream to upper layers by employing operating system APIs for intercommunication.

As shown in FIG. 4, the present host application 220 interacts with voice-capable modem 70 using communication APIs which are part of the operating system. It should be noted that alternative embodiments may also be implemented by developing custom drivers for transporting or making the connection directly between the audio board (sound card) and the serial virtual device driver. However, by employing system level APIS, standard operating system drivers may be employed. It should be noted that both sound data in digitized format and control channel data transfer between host application 220 and ring 0 processes by employing windows communication APIs. In the preferred embodiment, a WIN 16 COM API 86 provides the standardized API for communicating between ring 3 and ring 0. Although other APIs may be utilized, COM API 86 provides a refined messaging structure for communicating with traditionally "serial" devices such as UARTs. COM API 86 passes both control and sound data between the modem and the host software.

Speakerphone application software 220, in the preferred embodiment, is a 16-bit application and may be partitioned into at least three functional portions including a sound data transmit and receive portion 224 which may be considered as a data pump portion, a user interface portion 222 and a half duplex switching algorithm and control portion 226. Although the preferred embodiment implements a half duplex speakerphone, a full duplex implementation is within the bounds of alternative embodiments. Full duplex implementations do not require half duplex switching algorithm and control portion 226, however, some full duplex embodiments incorporate echo cancellation as described in FIGS. 5 and 6.

User interface portion 222 provides a basic user interface and conduit through which standard phone functionality is implemented. For example, user interface portion 222 presents a user with: (i) an interactive display wherein a user may select numbers for initiating a speakerphone communication session, and (ii) additional buttons for controlling characteristics of such a communication session such as speaker volume, microphone sensitivity, hold, mute, and other options as generically illustrated in host software 130 as depicted in FIG. 2.

Sound data transmit and receive portion 224 provides the data pump through which audio data is exchanged between modem 70 and audio board 68. Additionally, dialing directives such as DTMF tones are generated in the form of sound data by sound data transmit and receive portion 224 for dispatch through modem 70.

Half duplex switching algorithm and control portion 226 evaluates the energy received from audio board 68 and the energy from modem 70 for processing a decision on which direction to enable the transfer data. In the preferred embodiment, the switching algorithm is comprised of three operational states: (i) an idle state where the host software is listening to both modem 70 and audio board 68 in an effort to decide which way to direct data, (ii) a state where the host software is recording or storing data received from the modem and playing or enunciating the data through audio board 68 to speaker 32, and (iii) a state where the host software is recording from audio board 68 audio information received via microphone 30 and playing such received information to modem 70. In such a configuration, both modem 70 and audio board 68 are operating in half duplex modes. In an alternate embodiment where both modem 70 and audio board 68 operate in full duplex modes, the switching algorithm portion is unnecessary as data paths in both directions are fully implemented. However, in such a full duplex information, audio sound presented through speaker 32 may cause interference with audio sounds received at microphone 30 thereby requiring acoustic filtering of the user generated audio information. Details of acoustic filtering may be found by referencing FIG. 6.

In yet another half duplex alternate embodiment, half duplex switching algorithm and control portion 226 monitors the energy level of voice information generated by the remote party for making half duplex switching decisions. When the energy level of a remote party exceeds a predetermined threshold value, then the remote party retains the use of the channel and thereby precludes the host from entering the conversation. Such an energy monitoring configuration simplifies the software requirements for monitoring energy levels. Other embodiments wherein the audio board operates in full duplex mode, monitor both the energy level of the remote party generated voice data and the speakerphone user generated voice data to determine whether to configure the half duplex modem to transmit the user generated voice data or to receive and forward the remote party generated voice information to the user.

Host software 220, in the preferred embodiment, employs a multi-media API MM System API 228 for interfacing between the operating system and audio board 68. MM System API 228 provides a suite of interfacing capability for multi-media devices. A driver 230 operates as an intermediate driver for translating between MM System API 228 and the device driver, sound card VxD device driver 232. Sound card VxD device driver 232 provides the low-level driver interface for interfacing with standardized audio board 68. Although the preferred embodiment employs sound card VxD device driver 232 resident to Windows® operating systems, other custom drivers may be developed that properly interface with non-standard audio boards.

An I/O bus 234 provides the physical layer between the software host and audio board 68. I/O bus 234 may take the form of standard card buses such as ISA, EISA, PCI, VME or PCMCIA implementations. Audio board 68 provides the electrical and functional interface for transducing and conditioning audio signals both received by a microphone 30 or transmitted to a speaker 32 for audio generation. Although audio board 68 is shown as a discrete board or card, notebook and portable computers, that generally incorporate PCMCIA architecture, typically integrate the audio functionality on the host board for size and weight considerations.

Figure 5:
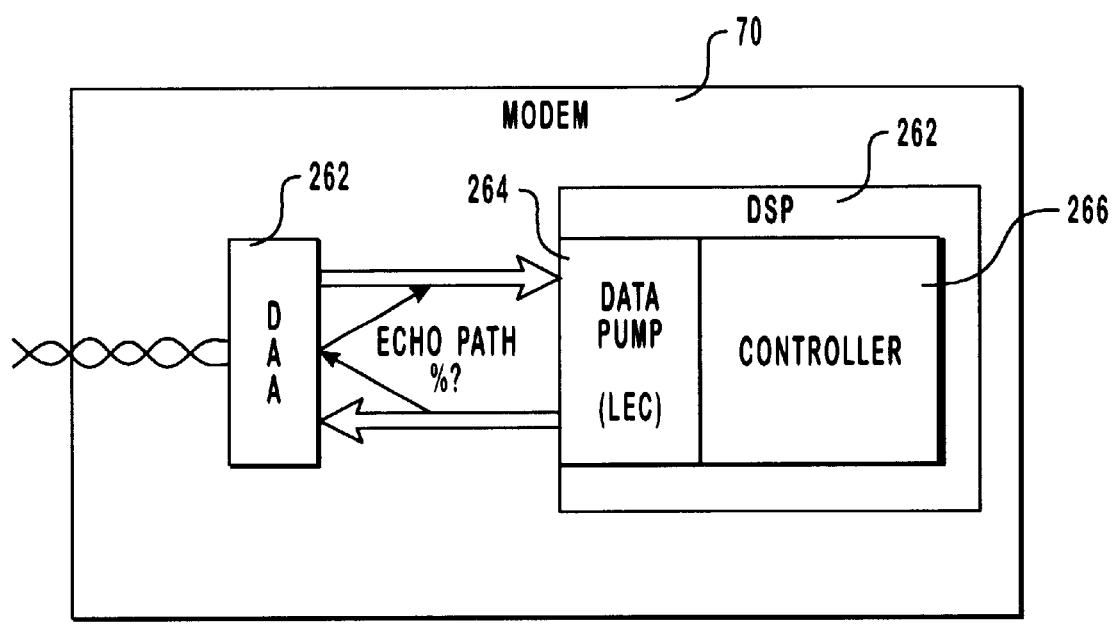
FIG. 5 is a simplified block diagram showing local echo cancellation within a modem capable of full duplex operation, in accordance with an embodiment of the present invention.

FIG. 5 is a simplified block diagram of local echo cancellation, in accordance with an embodiment of the present invention. A voice-capable modem 70 operating in full duplex mode both transmits and receives simultaneously across PSTN 12 (FIG. 4). A DAA 260 provides the appropriate required signal levels to drive the user generated voice information across PSTN 12. Due to the high transmission signal levels required for propagation to PSTN 12, interference may be created on the receive line in the form of a locally created echo. The locally created echo resulting from coupling on the received signal, if not filtered, creates an annoyance when returned to the originating party. Local echoes, if sufficiently small in magnitude, traditionally have been ignored or marginally treated. In the present invention, the local echo is mitigated by a local echo canceler resident within modem 70. In the preferred embodiment, a DSP 262 performs, among other things, (i) control functions such as session setup and breakdown and sampling rate selection via a controller portion 266 and (ii) data interfacing functions via a data pump portion 264.

Data pump portion 264, in a full duplex embodiment, is further comprised of a local echo canceler for mitigating the local echo produced by the full duplex transmission of user generated voice information. Local echo cancellation is performed by employing digital signal processing techniques within DSP 262. In the present embodiment, the local echo canceler is implemented as a digital filter taking the form of a multi-tap Finite Impulse Response (FIR) filter. The number of taps employed is a function of the amount of echo suppression desired. Selection of tap quantities and implementation of FIR filters within DSP 262 are known to those skilled in the art of digital signal processing.

Figure 6:
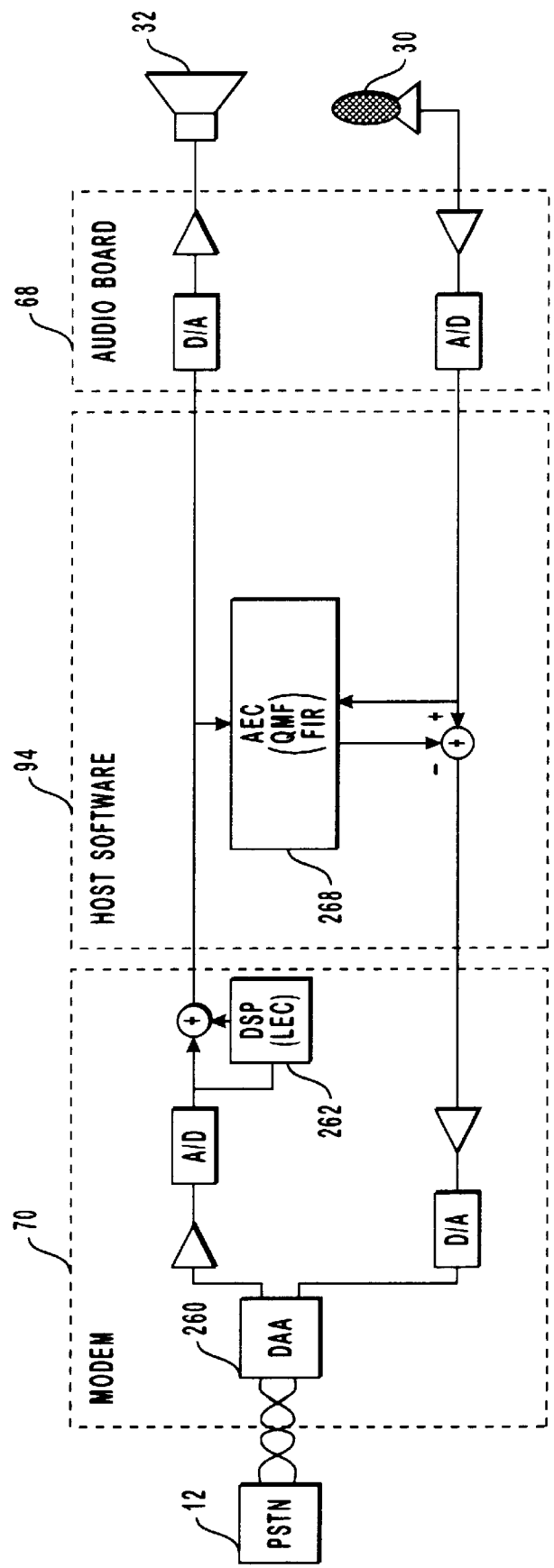
FIG. 6 is a block diagram showing acoustic echo cancellation incorporated within an embodiment of the present invention wherein the audio board is capable of full duplex operation.

FIG. 6 is a block diagram of an acoustic echo cancelling circuit, in accordance with an embodiment of the present invention. As discussed earlier, audio boards and modems may alternatively operate in full duplex mode. When an audio board 68 operates in full duplex mode, audio generated at speaker 32 which originated at a remote party may feedback through microphone 30 causing the remote party to perceive an echo of their originated signal. To suppress such an acoustic echo, host software 94 incorporates an acoustic echo cancellation module 268 to suppress such an annoyance. Acoustic echo cancellation module 268 receives both (i) a sample of the remote generated audio signal as a sample of the unadulterated audio signal and (ii) a user generated audio signal that may be comprised of user generated audio and an undesirable acoustic echo resulting from microphone 30 receiving audio as produced by speaker 32.

In the preferred embodiment, host software 94 implements acoustic echo canceler 268 using digital signal processing techniques, and more specifically, by employing quadrature mirror filtering (QMF) to break the data down to high and low sampling frequencies thus simplify the data before presentation to a subsequent FIR filter providing acoustic echo cancellation. Additionally, due to the inherent latency associated between the remote party generated audio signal as received by acoustic echo canceler 268 and the user generated audio having an acoustic echo of the remote party generated audio signal, an audio alignment module (not shown) provides a signal time alignment for digital processing. Following the time alignment, acoustic echo canceler 268 converts the time domain signals into wavelet domain-like time and frequency domain data for high and low pass filtering of the data. The FIR filter performs the final filtering of the data in the frequency domain. Once an error or acoustic echo cancelling signal is determined, it is mixed with the user generated audio data to counteract any acoustic echo that may be contaminating the user generated audio signal. While this embodiment employs a QMF digital process, other filtering techniques are similarly effective in cancelling an acoustic echo.

The present invention may be embodied in other specific forms without departing from its spirit or essential characteristics. The described embodiments are to be considered in all respect only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for operating a personal computer as a speakerphone for bi-directional audio communication between a user and a remote party, said method comprising the steps of:

operably connecting to the personal computer at a first connection point an audio component that is capable of converting an audio signal received at an audio input device into digital data, and that is capable of converting digital data into an audio signal for output to an audio output device;

operably connecting to the personal computer at a second connection point a modem component that is capable of transferring and receiving data and voice via a telephone network; and executing, at the personal computer, computer-executable instructions for transferring audio information between the audio component and the modem component, the computer executable instructions comprising the steps of:

a) for analog communication generated by said remote party,
   i) receiving digitized remote-party-generated audio as digitized by said modem component;
   ii) generating digitized user-consumed audio from said digitized remote-party-generated audio for presentation by said audio component to said user;

b) for analog communication generated by said user,
   i) receiving digitized user-generated audio as digitized by said audio component;
   ii) filtering said digitized user-generated audio to remove any acoustic echo; and
   iii) generating digitized remote-party-consumed audio from said digitized user-generated audio for transmission by said modem component;

c) when said modem component operates in half duplex mode, alternatingly converting said digitized remote-party-generated audio and digitized user-generated audio into digitized user-consumed audio and digitized remote-party-consumed audio, respectively, to provide a half-duplex implementation of said speakerphone;

d) when said modem component operates in a full duplex mode and said audio component operates in half duplex mode, comparing a relative signal level of said digitized remote-party-generated audio with a threshold energy value;

e) when said digitized remote-party-generated audio exceeds said threshold energy value, selecting said digitized remote-party-generated audio for presentation to said audio component as said digitized user-consumed audio; and f) when said digitized remote-party-generated audio does not exceed said threshold energy value, selecting said digitized user-generated audio for presentation to said modem component as said digitized remote-party-consumed audio.

2. The method as recited in claim 1, further comprising computer executable instructions comprising the step of simultaneously converting said digitized remote-party-generated audio and digitized user-generated audio into digitized user-consumed audio and digitized remote-party-consumed audio, respectively, to provide a full-duplex implementation of said speakerphone.

3. The method as recited in claim 1, wherein said modem component operating in said full duplex mode performs the steps comprising:

a) monitoring said digitized remote-party-consumed audio as transmitted by said modem component;

b) monitoring said digitized remote-party-generated audio to determine if transmission of said digitized remote-party-consumed audio by said modem component induces a local echo upon said digitized remote-party-generated audio; and c) filtering said local echo from said digitized remote-party-generated audio.

4. The method as recited in claim 1 further comprising the step of presenting on said personal computer an interactive graphical user interface for operating said speakerphone, said user interface to control said bi-directional analog communication between said user and said remote party.

5. In a personal computer having a modem operably connected at a first connection point on the computer, and an audio component connected at a second connection point on the computer, a method for bidirectional audio communication between a user and a remote party via a telephone network comprising the steps of:

a) receiving voice information from said remote party at said modem to generate digitized remote-party-generated audio for said computer;

b) receiving voice information from said user at said audio component to generate digitized user-generated audio;

c) when said modem operates in full duplex mode, comparing a relative signal level of said digitized remote-party-generated audio with a threshold energy value;

d) when said digitized remote-party-generated audio exceeds said threshold energy value, selecting said digitized remote-party-generated audio for presentation to said audio component as digitized user-consumed audio; and e) when said digitized remote-party-generated audio does not exceed said energy threshold value, selecting said digitized user-generated audio for presentation to said modem as digitized remote-party-consumed audio.

6. The method as recited in claim 5 wherein said comparing step comprises the step of when said modem operates in full duplex mode and said audio component operates in full duplex mode, filtering said digitized remote-party-generated audio from said digitized user-generated audio to remove an acoustic echo resulting between a speaker and a microphone connected to said audio component.

7. The method as recited in claim 5, wherein said modem further performs the steps of:

a) monitoring said digitized remote-party-consumed audio as transmitted by said modem;

b) monitoring said digitized remote-party-generated audio to determine if transmission of said digitized remote-party-consumed audio by said modem induces a local echo upon said digitized remote-party-generated audio; and c) filtering said local echo from said digitized remote-party-generated audio.

8. The method as recited in claim 5, further comprising the step of presenting on said personal computer an interactive graphical user interface to control said bidirectional audio communication between said user and said remote party.

9. In a personal computer having a voice-capable modem connected thereto via a first connection point and audio board connected thereto via a second connection point, a computer-readable medium having computer-executable instructions for transferring audio information between the modem and the audio board so as to provide a speakerphone for bi-directional analog communication between a user and a remote party, the computer executable instructions performing the steps comprising:

a) for analog communication generated by said remote party, i) receiving digitized remote-party-generated audio as digitized by said voice-capable modem;

ii) generating digitized user-consumed audio from said digitized remote-party-generated audio for presentation by said audio board to said user;

b) for analog communication generated by said user, i) receiving digitized user-generated audio as digitized by said audio board;

ii) filtering said digitized user-generated audio to remove any acoustic echo; and iii) generating digitized remote-party-consumed audio from said digitized user-generated audio for analog conversion and transmission by said voice-capable modem;

c) when said modem operates in half duplex mode, alternatingly converting said digitized remote-party-generated audio and digitized user-generated audio into digitized user-consumed audio and digitized remote-party-consumed audio, respectively, to provide a half-duplex implementation of said speakerphone;

d) when said modem operates in a full duplex mode and said audio board operates in a half duplex mode, comparing a relative signal level of said digitized remote-party-generated audio with a threshold energy value;

e) when said digitized party-generated audio exceeds said threshold energy value, selecting said digitized remote-party-generated audio for presentation to said audio board as said digitized user-consumed audio; and f) when said digitized remote-party-generated audio does not exceed said threshold energy value, selecting said digitized user-generated audio for presentation to said modem as said digitized remote-party-consumed audio.

10. The computer-readable medium of claim 9 having further computer-executable instructions for performing the steps of simultaneously converting said digitized remote-party-generated audio and digitized user-generated audio into digitized user-consumed audio and digitized remote-party-consumed audio, respectively, to provide a full-duplex implementation of said speakerphone.

11. The computer-readable medium of claim 9 wherein said voice-capable modem operating in said full duplex mode, further comprises computer-executable instructions for performing the steps of:

a) monitoring said digitized remote-party-consumed audio as transmitted by said voice-capable modem;

b) monitoring said digitized remote-party-generated audio to determine if transmission of said digitized remote-party-consumed audio by said voice-capable modem induces a local echo upon said digitized remote-party-generated audio; and c) filtering said local echo from said digitized remote-party-generated audio.

12. The computer-readable medium of claim 9 having further computer-executable instruction for performing the step of presenting on said personal computer an interactive graphical user interface for operating said speakerphone, said user interface to control said bi-directional analog communication between said user and said remote party.

* * * * *

UNITED STATES PATENT AND TRADEMARK OFFICE
CERTIFICATE OF CORRECTION

PATENT NO. : 6,044,150
DATED : March 28, 2000
INVENTOR(S) : Peter Rigstad; Nathan Whitney It is certified that error appears in the above-identified patent and that said Letters Patent are hereby corrected as shown below:

Col. 2, line 21, after "as" delete [a]

Col. 5, line 24, change "(QMF)before" to --(QMF) before--

Col. 9, line 49, after "transfer" insert --of--

Signed and Sealed this

Tenth Day of April, 2001

NICHOLAS P. GODICI

*Attest:*

*Attesting Officer*   *Acting Director of the United States Patent and Trademark Office*